United States Patent
Boislard et al.

(10) Patent No.: US 12,442,634 B2
(45) Date of Patent: *Oct. 14, 2025

(54) VISUAL AND/OR DIMENSIONAL TIP INSPECTION SYSTEMS AND METHODS

(71) Applicant: RAYTHEON TECHNOLOGIES CORPORATION, Farmington, CT (US)

(72) Inventors: Keith R. Boislard, Colchester, CT (US); Ozgur Erdinc, Mansfield, CT (US); Kathryn S. Conety, East Haddam, CT (US); Iuliana Cernatescu, Glastonbury, CT (US); Garrett Kernozicky, Mansfield, CT (US)

(73) Assignee: RTX CORPORATION, Farmington, CT (US)

( * ) Notice: Subject to any disclaimer, the term of this patent is extended or adjusted under 35 U.S.C. 154(b) by 498 days.

This patent is subject to a terminal disclaimer.

(21) Appl. No.: 17/744,538

(22) Filed: May 13, 2022

(65) Prior Publication Data

US 2023/0366673 A1 Nov. 16, 2023

(51) Int. Cl.
| | |
|---|---|
| G01B 11/06 | (2006.01) |
| F01D 5/20 | (2006.01) |
| F01D 5/28 | (2006.01) |
| F01D 11/12 | (2006.01) |
| G01B 11/30 | (2006.01) |

(52) U.S. Cl.
CPC ............ *G01B 11/0616* (2013.01); *F01D 5/20* (2013.01); *F01D 5/288* (2013.01); *F01D 11/122* (2013.01); *G01B 11/30* (2013.01); *F05D 2260/80* (2013.01)

(58) Field of Classification Search
CPC ....... G01B 11/0616; G01B 11/30; F01D 5/20; F01D 5/288; F01D 11/122; F01D 5/005; F05D 2230/72; F05D 2230/80; F05D 2230/90; F05D 2260/80
See application file for complete search history.

(56) References Cited

U.S. PATENT DOCUMENTS

| | | |
|---|---|---|
| 5,952,110 A | 9/1999 | Schell et al. |
| 5,972,424 A | 10/1999 | Draghi |
| 6,701,615 B2 | 3/2004 | Harding et al. |
| 7,327,857 B2 | 2/2008 | Lloyd, Jr. et al. |
| 7,561,729 B2 | 7/2009 | Willis |
| 8,807,955 B2 | 8/2014 | Wrabel et al. |
| 9,217,852 B2 | 12/2015 | Baleine |

(Continued)

OTHER PUBLICATIONS

USPTO; Non-Final Office Action dated Dec. 19, 2022 in U.S. Appl. No. 17/744,530.

(Continued)

*Primary Examiner* — Michael P LaPage
(74) *Attorney, Agent, or Firm* — SNELL & WILMER L.L.P.

(57) ABSTRACT

A method can comprise: scanning, via an optical scanner, a tip of an airfoil of a bladed rotor, the tip including a coating disposed thereon, the coating comprising a metal plating and a plurality of protrusions, each protrusion in the plurality of protrusions extending from the metal plating; comparing a coating parameter of the coating to a coating parameter threshold based on scanner data from the optical scanner; and determining whether the coating maintains sufficient coverage of the tip of the airfoil based on the comparing.

12 Claims, 8 Drawing Sheets

(56) References Cited

U.S. PATENT DOCUMENTS

| | | | |
|---|---|---|---|
| 9,453,727 B1* | 9/2016 | Bruck | G01B 7/16 |
| 10,527,524 B2 | 1/2020 | Stoyanov et al. | |
| 10,544,698 B2 | 1/2020 | Stoyanov et al. | |
| 10,914,690 B2 | 2/2021 | Schneider et al. | |
| 2007/0076845 A1 | 4/2007 | Subramanian et al. | |
| 2013/0004328 A1 | 1/2013 | Wrabel et al. | |
| 2015/0300920 A1 | 10/2015 | DeAscanis et al. | |
| 2016/0003092 A1 | 1/2016 | Chamberlain | |
| 2016/0059278 A1 | 3/2016 | Mantkowski et al. | |
| 2017/0176342 A1 | 6/2017 | Colletti | |
| 2017/0362952 A1* | 12/2017 | Stoyanov | F01D 11/122 |
| 2018/0066527 A1 | 3/2018 | Kadau et al. | |
| 2018/0207689 A1 | 7/2018 | Takeuchi et al. | |
| 2019/0172191 A1 | 6/2019 | Finn et al. | |
| 2021/0387746 A1 | 12/2021 | Danko | |
| 2022/0090582 A1* | 3/2022 | Boyd | F01D 21/003 |
| 2023/0249316 A1* | 8/2023 | Blair | B24C 7/0053 451/5 |
| 2023/0250730 A1* | 8/2023 | Shankar | F01D 11/14 415/118 |
| 2024/0060423 A1* | 2/2024 | Black | F01D 11/122 |

OTHER PUBLICATIONS

1 USPTO; Notice of Allowance dated Aug. 23, 2024 in U.S. Appl. No. 18/631,497.

European Patent Office; Search Report dated Sep. 25, 2023 in Application No. 23169609.7.

USPTO; Non-Final Office Action dated Nov. 17, 2023 in U.S. Appl. No. 17/744,523.

USPTO; Notice of Allowance dated Apr. 17, 2024 in U.S. Appl. No. 17/744,523.

USPTO; Restriction/Election Requirement dated Sep. 27, 2022 in U.S. Appl. No. 17/744,530.

USPTO; Notice of Allowance dated Jan. 22, 2024 in U.S. Appl. No. 18/339,839.

European Patent Office; Search Report dated Sep. 25, 2023 in Application No. 23169584.2.

European Patent Office; Search Report dated Sep. 21, 2023 in Application No. 23169324.3.

USPTO; Notice of Allowance dated Apr. 5, 2023 in U.S. Appl. No. 17/744,530.

* cited by examiner

VISUAL AND/OR DIMENSIONAL TIP INSPECTION SYSTEMS AND METHODS

FIELD

The present disclosure relates generally to cleaning and assessment systems and methods, and more particularly to, cleaning and assessment systems and methods for a tip of an airfoil of a bladed rotor.

BACKGROUND

Gas turbine engines (such as those used in electrical power generation or used in modern aircraft) typically include a compressor, a combustor section, and a turbine. The compressor and the turbine typically include a series of alternating rotors and stators. A rotor generally comprises a rotor disk and a plurality of airfoils. The rotor may be an integrally bladed rotor ("IBR") or a mechanically bladed rotor.

The rotor disk and airfoils in the IBR are one piece (i.e., monolithic, or nearly monolithic) with the airfoils spaced around the circumference of the rotor disk. Conventional IBRs may be formed using a variety of technical methods including integral casting, machining from a solid billet, or by welding or bonding the airfoils to the rotor disk.

Tips of airfoils for IBRs are often coated with a coating having an abrasive material, such a as cubic boron nitride ("cBN") coating or the like. The abrasive material is configured to interface with an abradable material disposed radially adjacent to the airfoil tip and coupled to a case, or any other surrounding support structure in the gas turbine engine. Initially, the abrasive material of the coating cuts into the abradable material, forming a trench, a recess, or the like. The coating is configured protect the tips of airfoils for the IBRs from burning up during operation.

At various maintenance intervals, or overhaul, for the gas turbine engine, each tip of an airfoil having the coating disposed thereon is inspected. Inspections are typically performed visually (i.e., in person or with pictures), which can be time consuming due to the number of airfoils in a compressor section of an aircraft, and provide inconsistent success criteria for determining whether a tip of an airfoil is acceptable for entry back into service.

SUMMARY

A method is disclosed herein. The method can comprise: scanning a tip of an airfoil of a bladed rotor with an optical scanner, the tip including a coating disposed thereon, the coating comprising a metal plating and a plurality of protrusions, each protrusion in the plurality of protrusions extending from the metal plating; and determining whether the coating maintains sufficient coverage of the tip of the airfoil based on scanner data from the optical scanner.

In various embodiments, the coating parameter includes a protrusion density. The determining can further comprise determining the coating does has insufficient coverage in response to the protrusion density being less than the coating parameter threshold in a local area of the coating. The protrusion density can correspond to a number of protrusions per unit area on the tip of the airfoil.

In various embodiments, the method further comprises replacing the coating in response to determining the coating does not maintain sufficient coverage.

In various embodiments, the coating parameter comprises a surface roughness.

In various embodiments, the method further comprises scanning, via a micro computed tomography scanner, an area of interest in response to determining additional data is desired to make a determination.

A method is disclosed herein. The method can comprise: visually inspecting a tip of an airfoil of a bladed rotor, the tip including a coating disposed thereon, the coating comprising a metal plating and a plurality of protrusions, each protrusion in the plurality of protrusions extending from the metal plating; determining, based on the visually inspecting, an area of interest on the tip of the airfoil; scanning the area of interest; and determining whether the coating maintains sufficient coverage of the tip of the airfoil based on scanner data from the scanning.

In various embodiments, the method further comprises comparing a coating parameter of the coating to a coating parameter threshold based on the scanner data. The coating parameter can include a protrusion density. The protrusion density can correspond to a number of protrusions per unit area on the tip of the airfoil.

In various embodiments, the method further comprises replacing the coating in response to determining the coating does not maintain sufficient coverage.

In various embodiments, a scanner performing the scanning comprises an optical scanner. The method can further comprise scanning, via a micro computed tomography scanner, the area of interest in response to determining additional data is desired.

In various embodiments, the method further comprises determining that the coating maintains sufficient coverage in response to determining a coating parameter for the tip of the airfoil is below a coating parameter threshold.

A coating assessment system is disclosed herein. The coating assessment system can comprise: a first scanner; a second scanner; a display; and a tangible, non-transitory computer-readable storage medium having instructions stored thereon that, in response to execution by a processor, cause the processor to perform operations comprising: receiving, via the processor and through the first scanner, first scanner data from the first scanner for a tip of an airfoil of a bladed rotor, the tip including a coating disposed thereon, the coating comprising a metal plating and a plurality of protrusions; receiving, via the processor and through the second scanner, second scanner data from the second scanner for the tip of the airfoil of the bladed rotor; and refining a coating parameter threshold for a coating parameter based on the first scanner data, the second scanner data, and previously received data.

In various embodiments, the coating assessment system further comprises a machine learning system including the processor and the tangible, non-transitory computer readable medium. The machine learning system can comprise one of a deep neural network (DNN) and an artificial neural network (ANN). The coating parameter can comprise a surface roughness.

In various embodiments, the first scanner comprises an optical scanner, and wherein the second scanner comprises a micro computed tomography scanner.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1A:
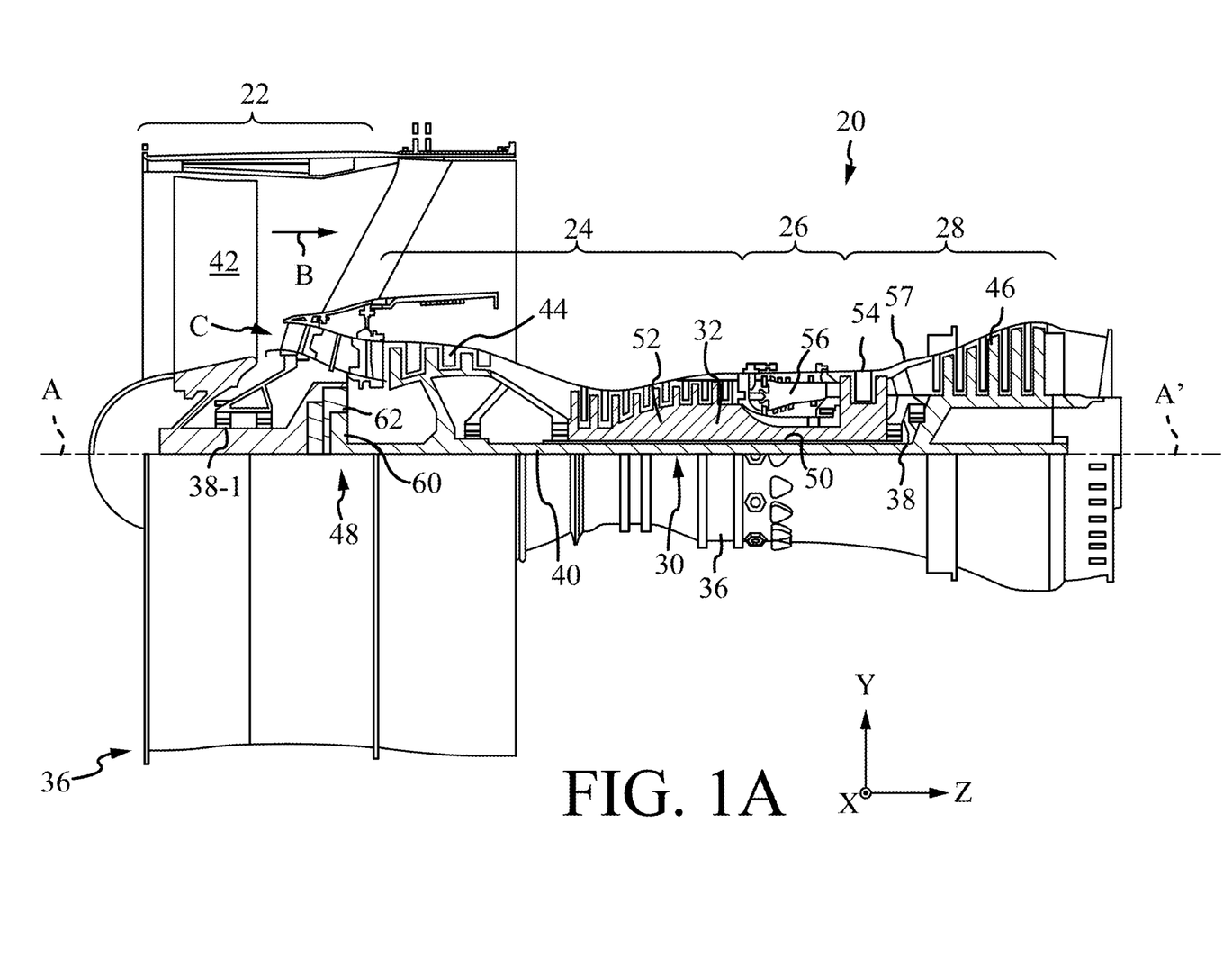
FIG. 1A illustrates a cross-sectional view of a gas-turbine engine, in accordance with various embodiments.

With reference to FIG. 1A, a gas turbine engine 20 is shown according to various embodiments. Gas turbine engine 20 may be a two-spool turbofan that generally incorporates a fan section 22, a compressor section 24, a combustor section 26, and a turbine section 28. In operation, fan section 22 can drive air along a path of bypass airflow B while compressor section 24 can drive air along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures, single spool architecture or the like.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, etc. Engine central longitudinal axis A-A' is oriented in the Z direction on the provided X-Y-Z axes. It should be understood that various bearing systems 38 at various locations may alternatively or additionally be provided, including for example, bearing system 38, bearing system 38-1, etc.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Figure 1B:
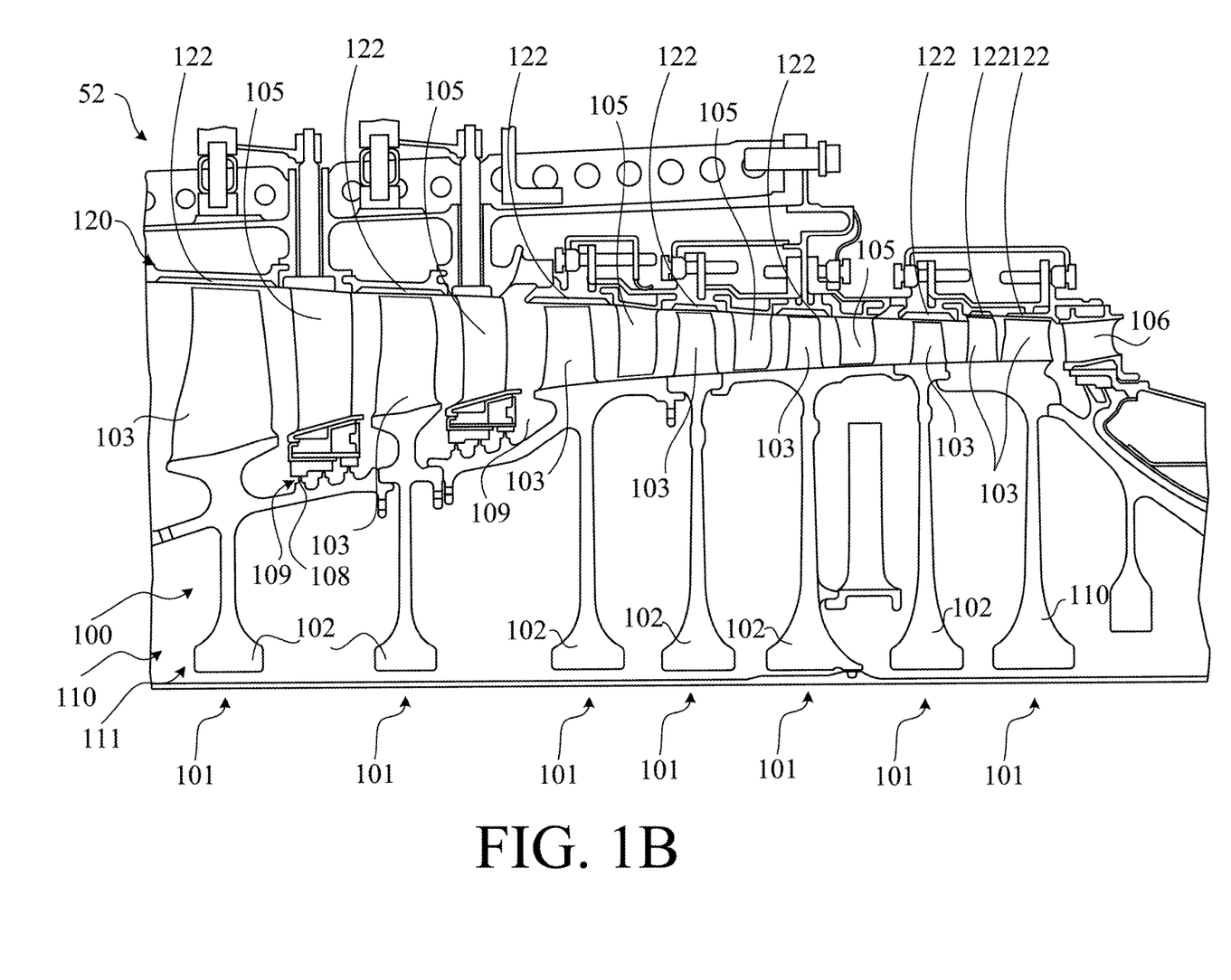
FIG. 1B illustrates a cross-sectional view of a high pressure compressor, in accordance with various embodiments.

In various embodiments, and with reference to FIG. 1B, high pressure compressor 52 of the compressor section 24 of gas turbine engine 20 is provided. The high pressure compressor 52 includes a plurality of blade stages 101 (i.e., rotor stages) and a plurality of vane stages 105 (i.e., stator stages). The blade stages 101 may each include a bladed rotor 100. In various embodiments, the bladed rotor 100 is an integrally bladed rotor, such that the airfoils 103 (e.g., blades) and rotor disks 102 are formed from a single integral component (i.e., a monolithic component formed of a single piece). However, the present disclosure is not limited in this regard. For example, the bladed rotor 100 can comprise a mechanically bladed rotor (i.e., each airfoil 103 mechanically coupled to the rotor disk 102). The airfoils 103 extend radially outward from the rotor disk 102. The gas turbine engine 20 may further include an exit guide vane stage 106 that defines the aft end of the high pressure compressor 52. Although illustrated with respect to high pressure compressor 52, the present disclosure is not limited in this regard. For example, the low pressure compressor 44 may include a plurality of blade stages 101 and vane stages 105, each blade stage in the plurality of blade stages 101 including the bladed rotor 100 and still be within the scope of this disclosure. In various embodiments, the plurality of blade stages 101 forms a stack of bladed rotors 110, which define, at least partially, a rotor module 111 of the high pressure compressor 52 of the gas turbine engine 20.

An outer engine case 120 is disposed radially outward from a tip of each airfoil 103. The outer engine case 120 comprises an abradable material 122 disposed radially adjacent to the tip of each airfoil 103. In this regard, the tip of each airfoil 103 comprises a coating, as described further herein, that includes an abrasive material. The abrasive material is configured to interface with the abradable material 122 of the outer engine case during operation of the gas turbine engine 20. Initially, the abrasive material of the coating cuts into the abradable material, forming a trench, a recess, or the like. The coating is configured protect the tips of airfoils 103 for the bladed rotors 100 from burning up during operation of the gas turbine engine 20.

Figure 2A:
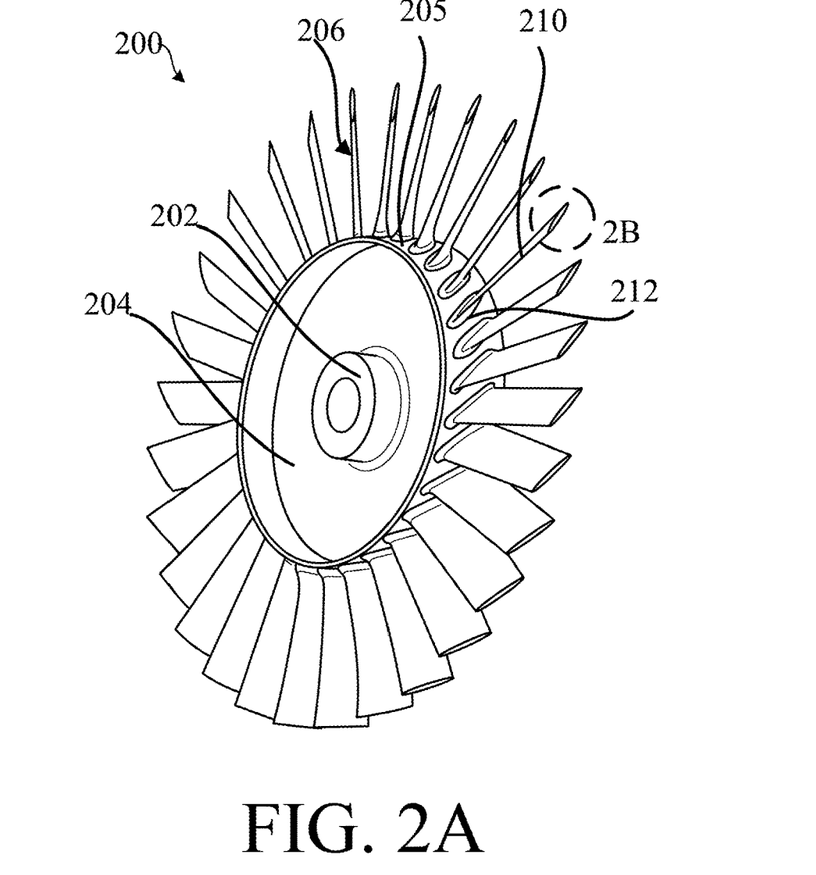
FIG. 2A illustrates a perspective view of a bladed rotor, in accordance with various embodiments.

Referring now to FIG. 2, a perspective view of a bladed rotor 200 is illustrated in accordance with various embodiments. The bladed rotor 200 can be in accordance with any of the bladed rotors 100 from FIG. 1A. The present disclosure is not limited in this regard. The bladed rotor 200 comprises a hub 202, a rotor disk 204 defining a platform 205, and a plurality of airfoils 206. Each airfoil in the plurality of airfoils 206 extends radially outward from the platform 205. For example, an airfoil 210 in the plurality of airfoils 206 extends radially outward from a root 212 of the airfoil 210 to a tip 214 of the airfoil. The root 212 can be integral with the platform 205 or coupled to the platform 205 as described previously herein. The present disclosure is not limited in this regard.

Figure 2B:
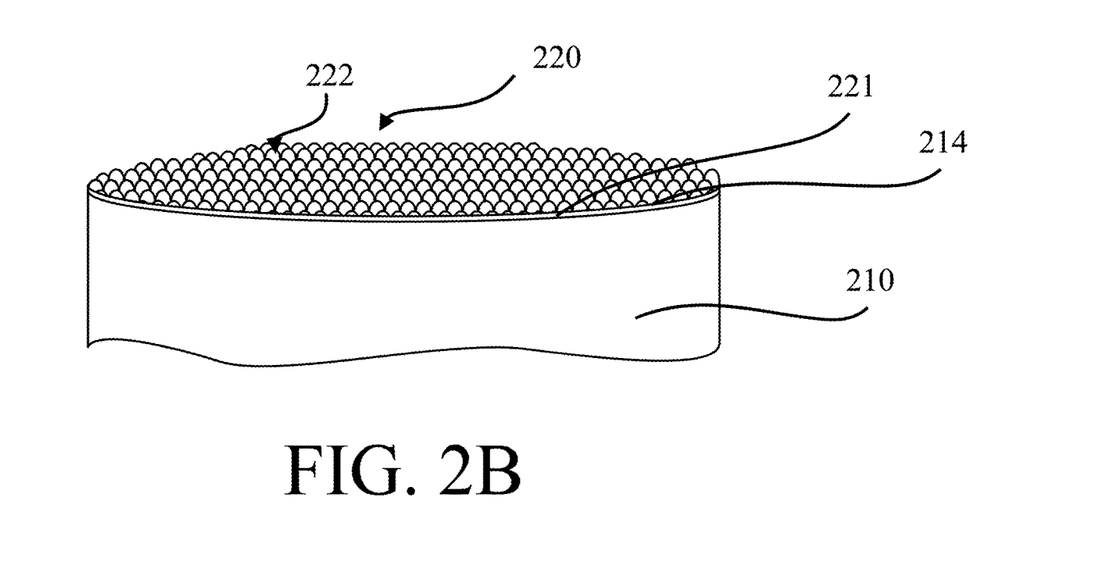
FIG. 2B illustrates a side view of a portion of an airfoil of a bladed rotor, in accordance with various embodiments.

Referring now to FIG. 2B, a detail view of portion of the airfoil 210 from FIG. 2A is illustrated, in accordance with various embodiments. Each airfoil in the plurality of airfoils 206 from FIG. 2A is in accordance with the airfoil 210. The airfoil 210 comprises a coating 220 disposed on the tip 214 of the airfoil 210. In various embodiments, the coating 220 comprises a metal plating 221 (e.g., a nickel plating or the like), and an abrasive material (e.g., alumina, cubic boron nitride, silicon carbide, tungsten carbide, silicon nitride, or titanium diboride) extending outward from the metal plating 221. For example, the coating 220 includes a plurality of protrusions 222 (i.e., grits). Each protrusion in the plurality of protrusions 222 extends radially outward from the tip 214 of the airfoil 210 (e.g., towards the abradable material 122 from FIG. 1B when installed). In various embodiments, each protrusion in the plurality of protrusions 222 of the coating 220 comprises cubic boron nitride.

Figure 3:
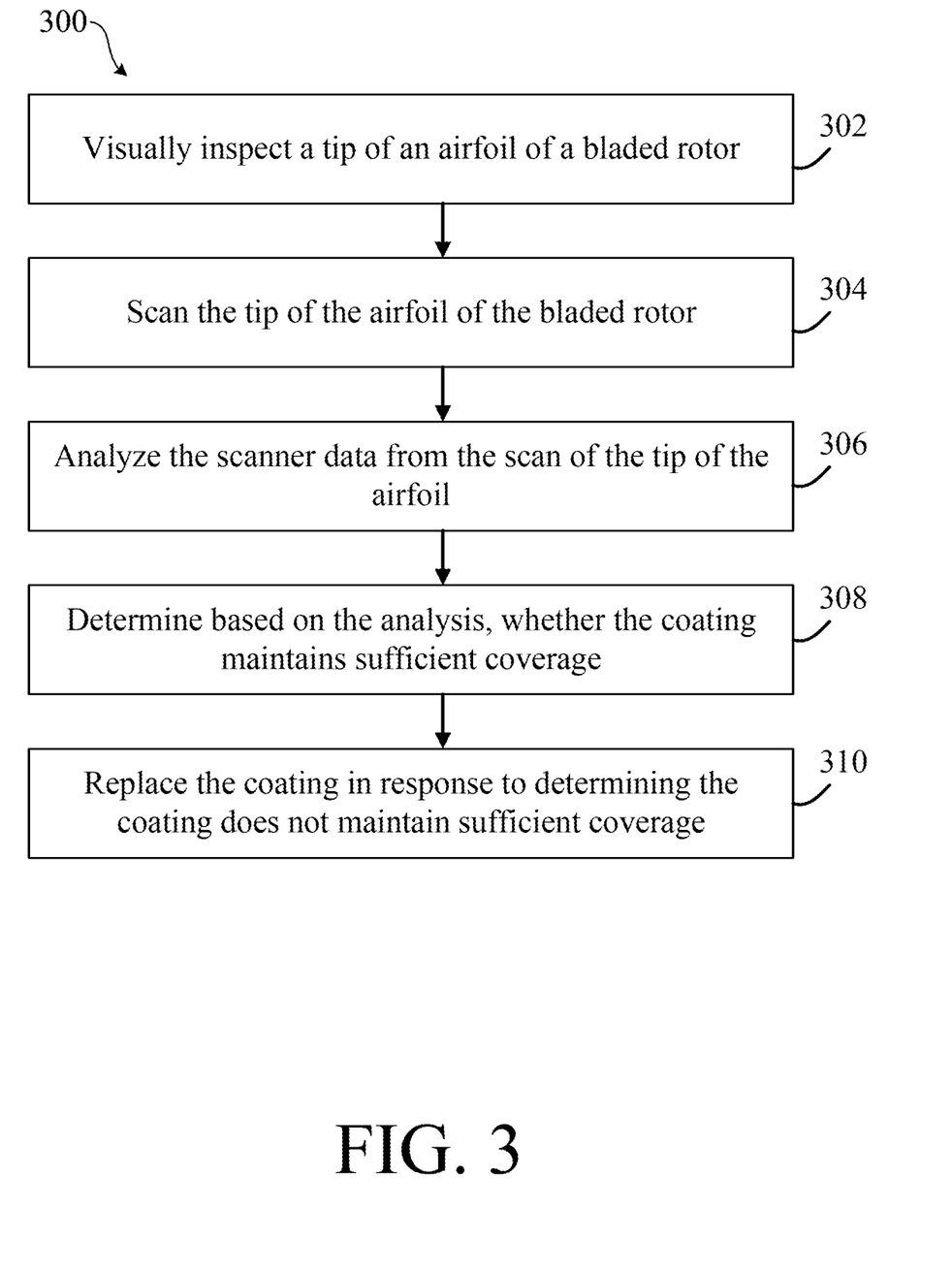
FIG. 3 illustrates a method of inspecting and assessing a tip of an airfoil for a bladed rotor.

Referring now to FIG. 3, a method 300 for assessing a tip of an airfoil for a bladed rotor (e.g., bladed rotor 200) is illustrated, in accordance with various embodiments. In various embodiments, the method 300 comprises visually inspecting the tip of the airfoil for the bladed rotor (step 302). In this regard, an inspector, or the like, can analyze the tip of the airfoil on visual imagery alone to determine whether there are any areas of interest (i.e., areas on the tip that appear to have a low density of protrusions in a specific area, as defined further herein).

Figure 4:
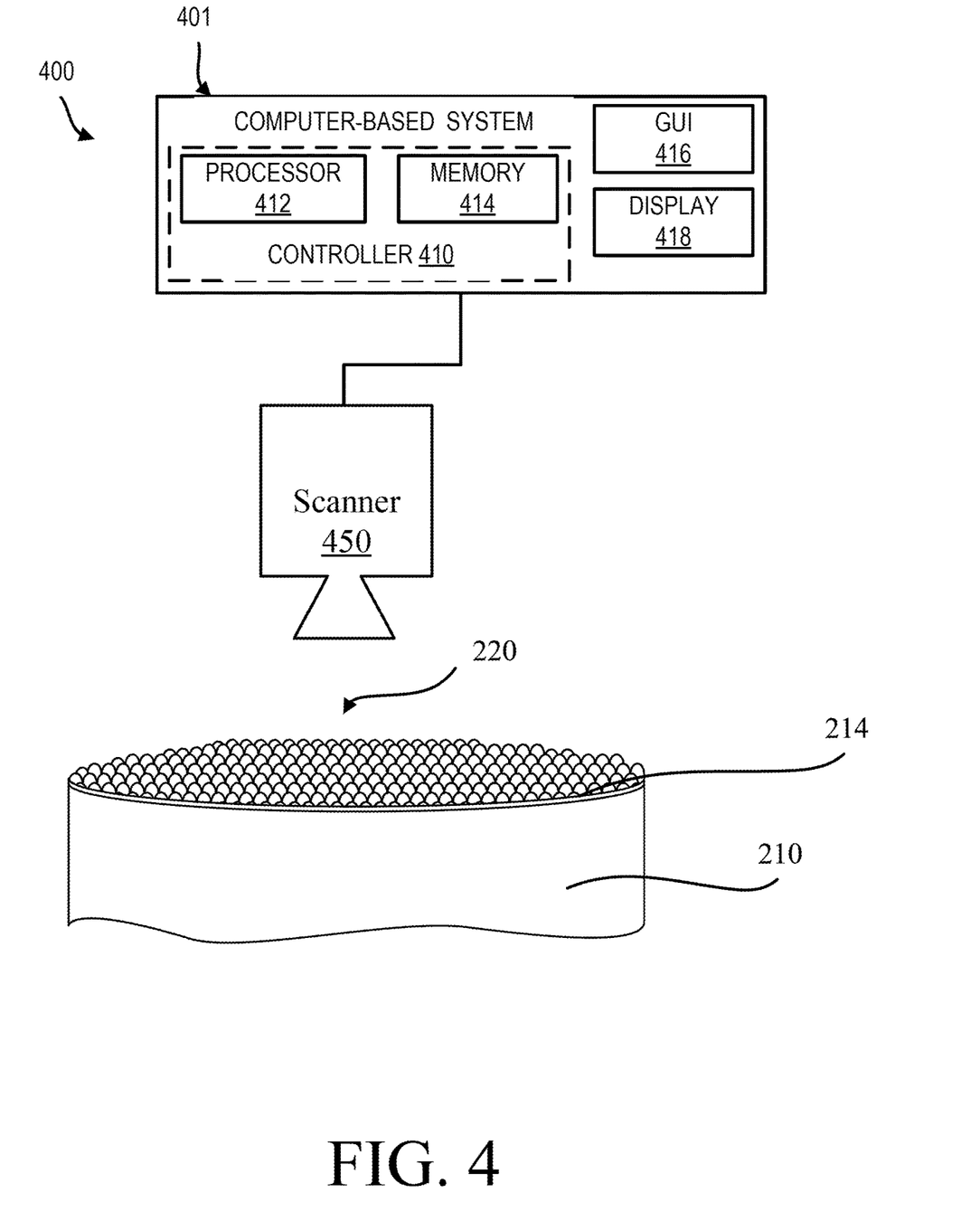
FIG. 4 illustrates an airfoil tip assessment system in use, in accordance with various embodiments.
Figure 5:
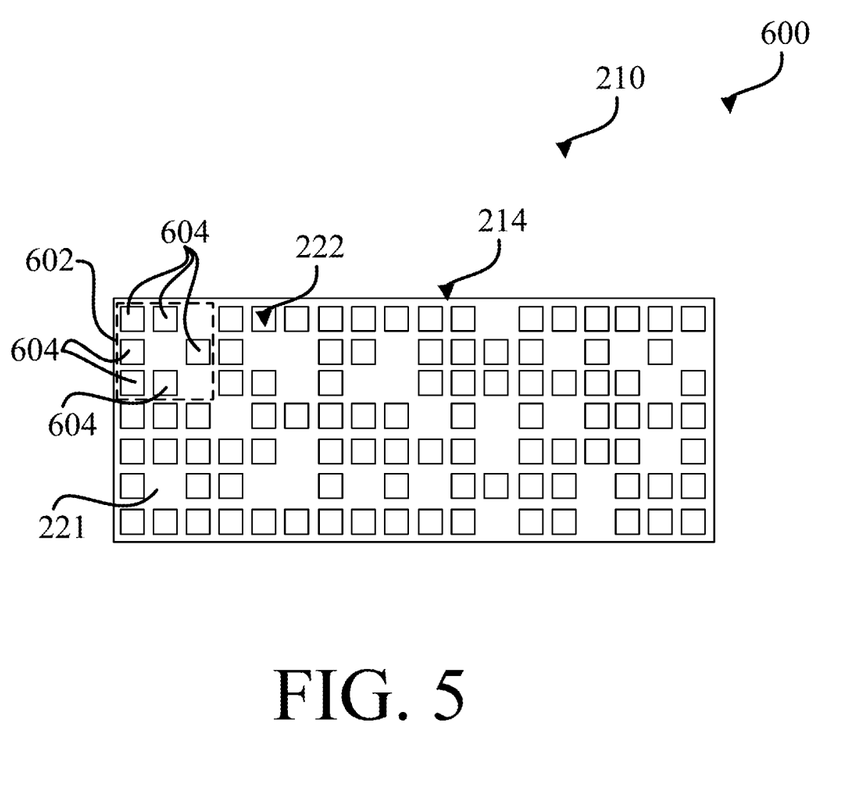
FIG. 5 illustrates an image from a scanner of the airfoil tip assessment system, in accordance with various embodiments.

The method 300 further comprise scanning at least the area of interest of the tip 214 of the airfoil 210 in response to determining there is the area of interest (step 304). With reference now to FIG. 4, an airfoil tip assessment system 400 for performing step 304 of method 300 is illustrated, in accordance with various embodiments. The airfoil tip assessment system 400 includes a scanner 450 and a computer-based system 401 including a controller 410, a graphical user interface (GUI) 416, and a display 418. In various embodiments, the computer-based system 401 may further be coupled to, and configured to control, a motor coupled to a shaft that mounts to a bladed rotor 200 from FIG. 2A. In this regard, the scanner 450 may be configured to scan a tip of each airfoil of a bladed rotor 200 from FIG. 2A. Thus, an airfoil tip inspection time may be greatly reduced for a bladed rotor 200, in accordance with various embodiments. In various embodiments, the scanner 450 is a handheld scanner and can be configured to be operated by the inspector in response to determining a respective area of interest. In this regard, the bladed rotor 200 can be visually inspected and only areas of interest scanned to more efficiently review and analyze tips 214 of airfoils 210 of the bladed rotor 200, in accordance with various embodiments. In this regard, the scanner 450 may be configured to removably couple to the computer-based system 401, or a memory card may be configured to couple to the computer-based system 401, or the like. The present disclosure is not limited in this regard.

In various embodiments, the computer-based system 401 comprises a controller 410. In various embodiments the GUI 416, display 418, and the scanner 450 are in electronic communication (e.g., wireless or wired) with the scanner 450. In various embodiments, controller 410 may be integrated into computer system. In various embodiments, controller 410 may be configured as a central network element or hub to access various systems and components of the airfoil tip assessment system 400. Controller 410 may comprise a network, computer-based system, and/or software components configured to provide an access point to various systems and components of the inspection system. In various embodiments, controller 410 may comprise a processor 412. In various embodiments, controller 410 may be implemented in a single processor. In various embodiments, controller 410 may be implemented as and may include one or more processors and/or one or more tangible, non-transitory memories (e.g., memory 414) and be capable of implementing logic (e.g., memory 414). Each processor can be a general purpose processor, a digital signal processor (DSP), an application specific integrated circuit (ASIC), a field programable gate array (FPGA) or other programable logic device, discrete gate or transistor logic, discrete hardware components, or any combination thereof. Controller 410 may comprise a processor 412 configured to implement various logical operations in response to execution of instructions, for example, instructions stored on a non-transitory, tangible, computer-readable medium (e.g., memory 414) configured to communicate with controller 410. In various embodiments, the computer-based system 401 is a machine learning system (e.g., a deep neural network (DNN), an artificial neural network (ANN), or the like). In this regard, inspection parameters for the tip 214 of the airfoil 210 can be refined overt time based on continuous learning by the computer-based system 401 as described further herein.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the scanner 450 comprises an optical scanner (e.g., structured light scanners, such as white light scanners, structured blue light scanners, a coordinate measurement machine (CMM), or the like), a mechanical scanner, a laser scanner, a non-structured optical scanner, a non-visual scanner (e.g., computed tomography), or the like. In various embodiments, the scanner 450 comprises a micro computed topography (micro-CT) scanner. In this regard, the scanner 450 provides scanner data illustrating elemental particle distribution. Thus, a user can distinguish between nickel alloys, titanium alloys, cubic boron nitride of a coating, etc. Thus, based on scanner data from the scanner 450, a coating 220 of a tip 214 of an airfoil 210 can be assessed in a more accurate and precise manner as described further herein.

Referring back to FIG. 3, the method 300 further comprises analyzing the scanner data (step 306). In various embodiments, analyzing in step 306 can be performed by the processor 412 from airfoil tip assessment system 400. Although described herein as being performed by the processor 412, the present disclosure is not limited in this regard, and one skilled in the art may readily recognize that a user can interpret and analyze the scanner data, in accordance with various embodiments.

In various embodiments, step 306 further comprises comparing a coating parameter to a coating parameter threshold. For example, the coating parameter can include a surface roughness, a protrusion density, or the like. In various embodiments, the coating parameter is a protrusion density. For example, referring now to FIG. 6, an image 600 based on scanner data from the scanner 450, with like numerals depicting like elements, is illustrated, in accordance with various embodiments. Based on the scanner data, each and every local area of the tip 214 of the airfoil may be analyzed to determine if the local area has a protrusion density above a protrusion density threshold. For example, a local area 602 can be analyzed by comparing a number of remaining protrusions 604 to a threshold number of protrusions (i.e., an acceptable number of protrusions). In various embodiments, the local area 602 comprises seven protrusions, where the local area 602 typically has nine protrusions when originally manufactured. Although the typical newly manufactured local area 602 includes nine protrusions, a protrusion threshold (i.e., to achieve acceptable abradable characteristics of coating 220), six protrusions may be acceptable. In this regard, a protrusion threshold for the local area 602 may be six protrusions or greater. In this regard, acceptable criteria for a coating 220 being inspected at various maintenance intervals or overhaul may be significantly more consistent, precise, and reliable, and/or may be performed more efficiently relative to typical assessments for a tip of an airfoil 210, in accordance with various embodiments.

Referring back to FIG. 3, the method 300 further comprises determining, based on the analysis of step 306, whether the coating maintains sufficient coverage (step 308). In this regard, an entire tip 214 of an airfoil 210 may be analyzed in accordance with the method described in FIG. 6, and if any local area is determined to have a protrusion density less than a protrusion density threshold, then the controller 410 of the airfoil tip assessment system 400 displays the coating 220 at the tip 214 of the airfoil 210 as having to be replaced.

The method 300 further comprises replacing the coating 220 with a new coating in response to determining the coating 220 does not maintain sufficient coverage (step 310). Replacing coating 220 may be a time intensive process, in accordance with various embodiments. In this regard, by accurately and consistently assessing a coating 220 of an airfoil, unnecessary replacement of coating 220 may be eliminated, greatly decreasing an overhaul or maintenance interval for a bladed rotor 200, in accordance with various embodiments.

Figure 6:
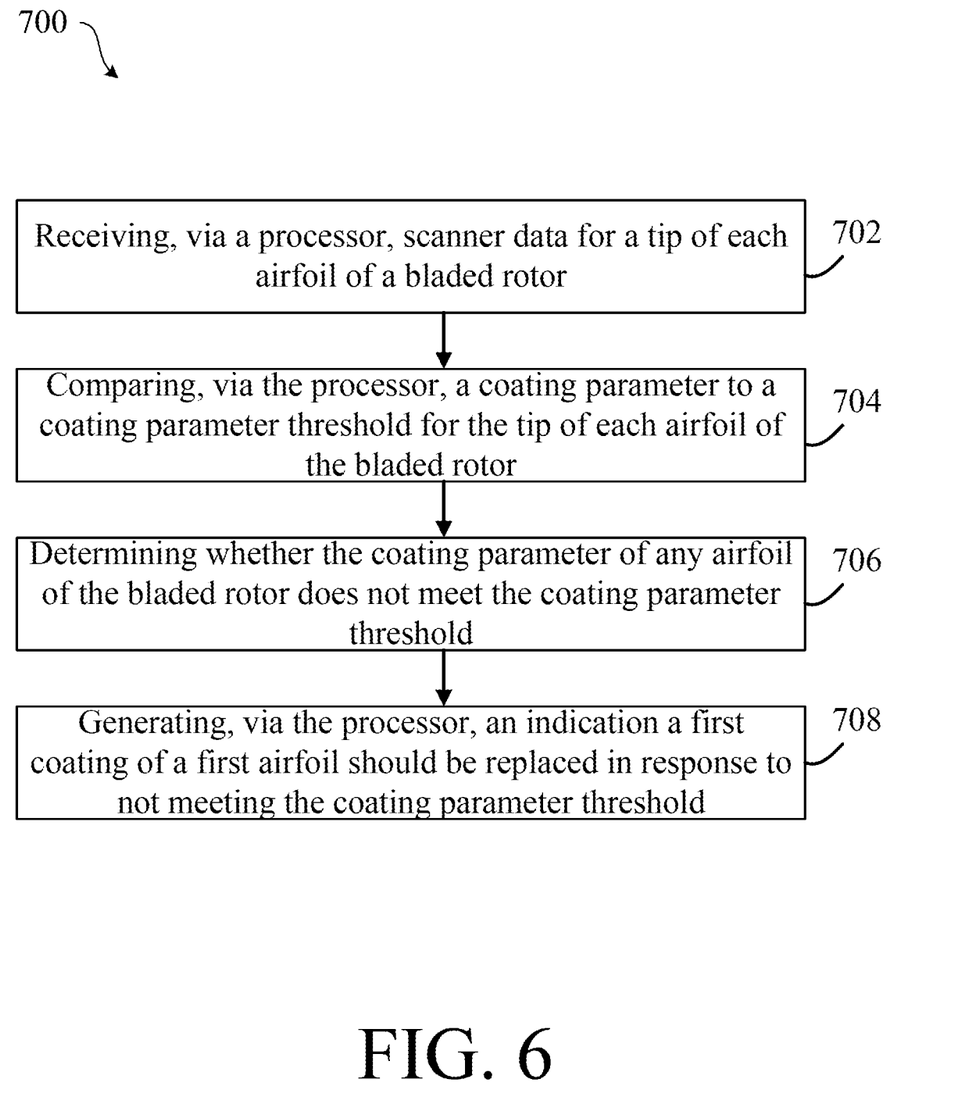
FIG. 6 illustrates an assessment process performed by the airfoil tip assessment system, in accordance with various embodiments.

Referring now to FIG. 6, an assessment process 700 performed by the airfoil tip assessment system 400 from FIG. 4, is illustrated, in accordance with various embodiments. The assessment process 700 comprises receiving, via the processor 412, scanner data from the scanner 450 for a tip 214 of each airfoil 210 in a plurality of airfoils 206 of a bladed rotor 200 (step 702).

The process 700 further comprises comparing, via the processor 412, a coating parameter (e.g., surface roughness, protrusion density, etc.) to a coating parameter threshold for the tip 214 of each airfoil 210 in the plurality of airfoils 206 of the bladed rotor 200 (step 704).

The process 700 further comprises determining, via the processor, whether the coating parameter of any airfoil of the bladed rotor does not meet the coating parameter threshold (step 706). In response to not meeting the coating parameter threshold, the processor 412 generates an indication that a first coating of a first airfoil should be replaced (step 708). In this regard, each airfoil can be tagged with an identifier (e.g., a radio frequency identification tag, a barcode, or the like) and scanned prior to scanning a respective tip, so any coatings that are to be replaced can be located easily.

In various embodiments, the process 700 is more efficient and less time consuming relative to visual inspections typically employed for assessing coverage of a coating on a tip of an airfoil.

Figure 7:
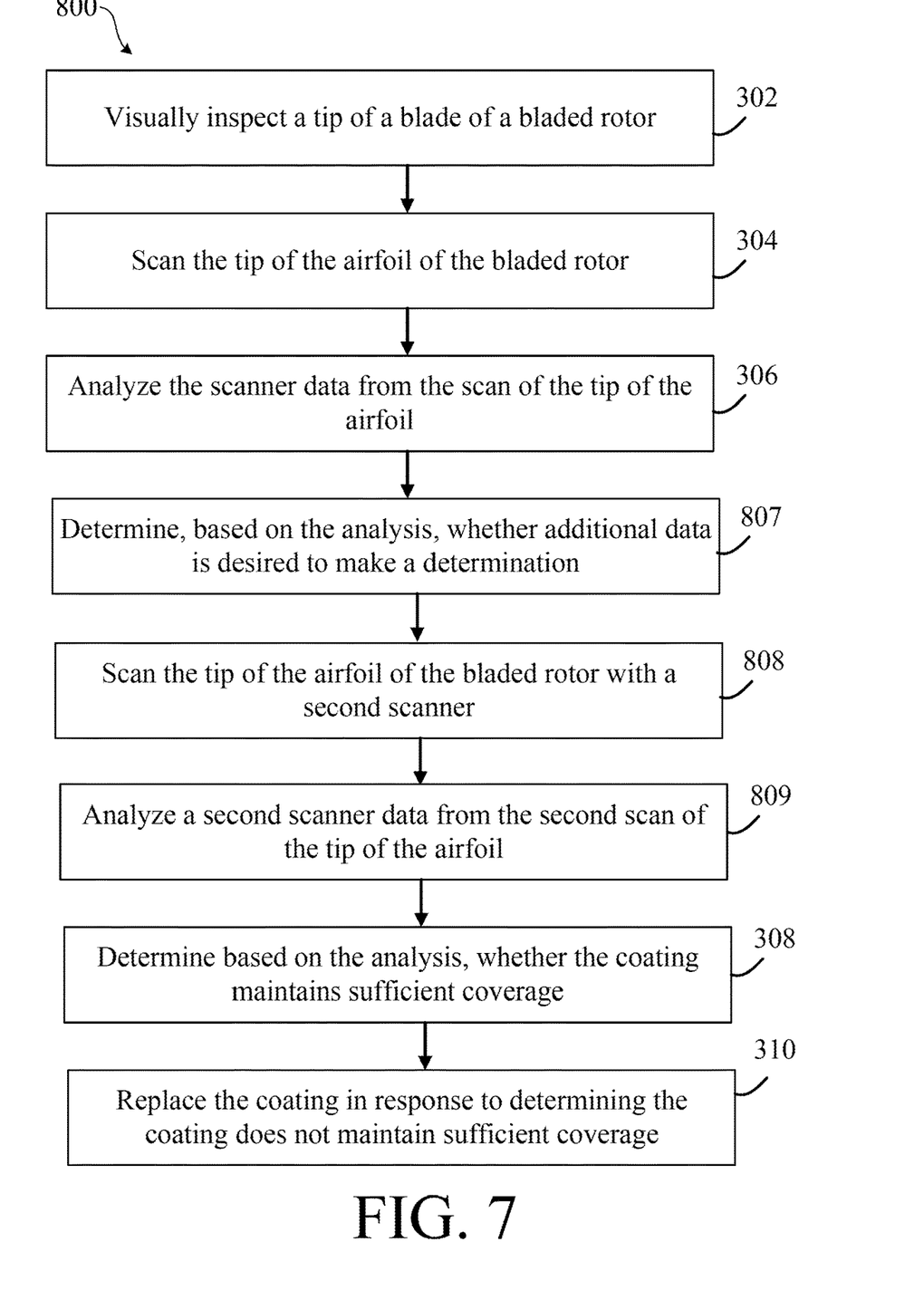
FIG. 7 illustrates a method of inspecting and assessing a tip of an airfoil for a bladed rotor.

Referring now to FIG. 7, a method 800 for assessing a tip of an airfoil for a bladed rotor (e.g., bladed rotor 200) is illustrated, with like numerals depicting like elements, in accordance with various embodiments. In various embodiments, between steps 306 and 308 of method 300, steps 807, 808, and 809 can be performed. For example, scanning the tip 214 of the airfoil 210 of the bladed rotor 200 in step 304 can be performed via a dimensional measurement scanner as described previously herein (e.g., an optical scanner, or the like). In this regard, a scan be performed rather quickly (e.g., via a handheld scanner or the like) in response to determining an area of interest in step 302. However, data from the dimensional measurement scanner may not be sufficient to make a determination of acceptability. In this regard, for areas that remain questionable after scanning via the dimensional measurement scanner, a tomographic scan can be performed to provide further fidelity to the analysis.

For example, the method 800 can comprise determining, based on the analysis in step 306, whether additional data is desired to make a determination for the coating 220 (step 807). In this regard, if scanner data from step 304 indicates that the coating parameter is within a threshold range (e.g., plus or minus 5% from a threshold for the parameter, or plus or minus 10% from the threshold of the parameter), the method can proceed to step 808.

In various embodiments, the method 800 further comprises scanning at least the area of interest of the tip 214 of the airfoil 210 of the bladed rotor 200 with a second scanner in response to determining additional data was desired in step 807 (step 808). In various embodiments, the second scanner comprises a micro computed topography (micro- CT) scanner as described previously herein. In this regard, greater fidelity of a status of the coating 220 on the tip 214 of the airfoil 210 can be determined. Micro-CT scanners can take longer for processing relative to dimensional measurement scanners described previously herein. However, micro-CT scanners can provide additional data as the micro-CT scanner utilizes X-ray scanning to recreate a three-dimensional model of the tip 214 of the airfoil in a non-destructive manner.

In various embodiments, the method 800 further comprises analyzing a second scanner data from the second scan in step 808 of the tip 214 of the airfoil 210 (step 809). In this regard, the coating parameter can be re-analyzed based on the second scanner data from step 808. In various embodiments, the second scanner data provides greater fidelity. In this regard, the computer-based system 401 from FIG. 4 can utilize machine learning, as described previously herein, to correlate the scanner data from the first scan in step 304 to the second scanner data from the second scan in step 808. Thus, the computer-based system can become more robust in its analysis over time, in accordance with various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method, comprising:
   scanning a tip of an airfoil of a bladed rotor with a handheld dimensional measurement scanner, the tip including a coating disposed thereon, the coating comprising a metal plating and a plurality of abrasive protrusions, each abrasive protrusion in the plurality of abrasive protrusions extending from the metal plating;
   determining whether the abrasive protrusions of the coating of the tip of the airfoil maintain a surface roughness of the coating above a threshold surface roughness based on scanner data from the handheld dimensional measurement scanner; and
   determining whether the coating maintains a protrusion density above a threshold density.

2. The method of claim 1, wherein the determining further comprises determining the coating has insufficient coverage in response to at least one of the surface roughness being less than the threshold surface roughness or the protrusion density being less than the threshold density in a local area of the coating.

3. The method of claim 1, wherein the protrusion density corresponds to a number of abrasive protrusions per unit area on the tip of the airfoil.

4. The method of claim 2, further comprising replacing the coating in response to determining the coating does not maintain at least one of the surface roughness above the threshold surface roughness or the protrusion density above the threshold density.

5. The method of claim 1, further comprising scanning, via an area of interest with micro computed tomography scanner in response to determining additional data is desired to make a determination.

6. A method, comprising:
   visually inspecting a tip of an airfoil of a bladed rotor, the tip including a coating disposed thereon, the coating comprising a metal plating and a plurality of abrasive protrusions, each abrasive protrusion in the plurality of abrasive protrusions extending from the metal plating;
   determining, based on the visually inspecting, an area of interest on the tip of the airfoil;
   scanning the area of interest with a handheld dimensional measurement scanner;
   determining whether the abrasive protrusions of the coating of the tip of the airfoil maintain a surface roughness of the coating above a threshold surface roughness based on scanner data from the scanning; and determining whether the coating maintains a protrusion density above a threshold density.

7. The method of claim 6, further comprising comparing the surface roughness of the coating to the threshold surface roughness based on the scanner data.

8. The method of claim 6, wherein the protrusion density corresponds to a number of protrusions per unit area on the tip of the airfoil.

9. The method of claim 6, further comprising replacing the coating in response to determining the coating does not maintain at least one of the surface roughness above the threshold surface roughness or the protrusion density above the threshold density.

10. The method of claim 6, wherein a scanner performing the scanning comprises at least one of a structured blue light scanner, a coordinate measurement scanner, a non-visual scanner, or a laser scanner.

11. The method of claim 10, further comprising scanning, via a micro computed tomography scanner, the area of interest in response to determining additional data is desired.

12. The method of claim 6, further comprising determining that the coating maintains sufficient coverage in response to determining that the surface roughness is above the threshold surface roughness and the protrusion density is above the threshold density.

* * * * *